(12) United States Patent
Zarou

(10) Patent No.: US 8,851,338 B2
(45) Date of Patent: Oct. 7, 2014

(54) CONTROLLED DISPENSER

(76) Inventor: John H Zarou, St. Johns, FL (US)

(*) Notice: Subject to any disclaimer, the term of this patent is extended or adjusted under 35 U.S.C. 154(b) by 64 days.

(21) Appl. No.: 13/472,540

(22) Filed: May 16, 2012

(65) Prior Publication Data

US 2012/0292349 A1    Nov. 22, 2012

Related U.S. Application Data

(60) Provisional application No. 61/486,490, filed on May 16, 2011.

(51) Int. Cl.
*G01F 11/10*    (2006.01)
*G01F 23/26*    (2006.01)

(52) U.S. Cl.
CPC .................................. G01F 23/261 (2013.01)
USPC ........ 222/368; 222/129; 222/144.5; 222/363; 222/452

(58) Field of Classification Search
CPC ..... G01F 11/10; G01F 11/24; B65G 53/4633; B65D 81/3222; B65D 21/0231; A47G 2019/122
USPC .............. 222/368, 129, 138, 143, 144.5, 363, 222/427, 431, 452
See application file for complete search history.

(56) References Cited

U.S. PATENT DOCUMENTS

| | | | | |
|---|---|---|---|---|
| 629,720 | A * | 7/1899 | Holmes | 48/46 |
| 1,502,992 | A * | 7/1924 | Lanphere | 222/271 |
| 1,503,127 | A * | 7/1924 | Lanphere | 222/238 |
| 2,029,056 | A * | 1/1936 | Carlson | 401/208 |
| 2,424,675 | A | 7/1947 | Wood | |
| 2,426,883 | A * | 9/1947 | Kartyshai | 132/314 |
| 3,276,636 | A | 10/1966 | Johnson, Jr. | |
| 3,318,491 | A | 5/1967 | Williamson | |
| 3,704,816 | A * | 12/1972 | Gandrud | 222/368 |
| 3,718,234 | A * | 2/1973 | Bagguley | 222/135 |
| 4,189,066 | A | 2/1980 | Berghahn | |
| 4,285,448 | A * | 8/1981 | Group | 222/613 |
| 4,342,522 | A | 8/1982 | Mackles | |
| 4,368,184 | A | 1/1983 | Drucker et al. | |
| 4,522,313 | A | 6/1985 | Jennings et al. | |
| 4,828,143 | A | 5/1989 | Jennings | |
| 4,892,233 | A * | 1/1990 | Zelickson | 222/226 |
| 5,547,110 | A | 8/1996 | Keller et al. | |
| 6,112,942 | A | 9/2000 | Deacon | |
| 6,267,265 | B1 | 7/2001 | Issa | |
| 7,654,416 | B2 * | 2/2010 | Buining et al. | 222/144 |
| 2006/0122567 | A1 | 6/2006 | Kennedy | |
| 2007/0059090 | A1 | 3/2007 | Ceccarelli et al. | |
| 2010/0270331 | A1 | 10/2010 | Cummins et al. | |

OTHER PUBLICATIONS

Kitchenart, Spice Dome, publication date unknown (retrieved May 27, 2012 <http://www.kitchenart.com/ProductDetails.asp?ProductCode=74206>), USA, see p. 1.

\* cited by examiner

*Primary Examiner* — Frederick C Nicolas
(74) *Attorney, Agent, or Firm* — Panovia Group LLP

(57) ABSTRACT

A dispenser device for dispensing a controlled number of solid items, or a certain quantity of a variable quantity substance, such as a powdered, granular or liquid substance, through rotation of a roller having one or more cavities for delivering an item or substance.

17 Claims, 9 Drawing Sheets

CONTROLLED DISPENSER

CROSS-REFERENCE TO RELATED APPLICATIONS

This application claims the benefit under 35 U.S.C. §119(e) of U.S. Provisional Application 61/486,490, filed May 16, 2011, which is hereby incorporated herein by reference.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

1. Field of the Invention

The invention relates generally to the field of dispensers. More specifically, the invention relates to a dispenser device for dispensing a controlled number of items or amount of a substance, such as from a container. More specifically still, the invention may be applicable to a number of fields including, for example, medicine (for dispensing pills, capsules or other forms), culinary industry (for dispensing controlled amounts of spices or other powdered, grated or granular materials), food (e.g., candy dispensers), and manufacturing (e.g., controlled dispensing in an assembly line), among others.

2. Description of the Related Art

It may be desirable in various environments to dispense material, substance, objects or items in a controlled and convenient manner. In medicine, patients having any of a variety of infirmities may, for example, suffer from pain or a lack of dexterity in their hands, and benefit from a convenient dispenser, which in some embodiments may be adapted for one-handed operation. In cooking, it may be desirable to dispense a controlled quantity of a substance for flavoring into the palm of the hand for adding to a meal accurately and easily. Novelty apparatus may appeal to various audiences for the dispensing of candy or other food items, etc. Manufacturing and food preparation/decoration assembly lines may benefit from controlled dispensing of necessary solid, powdered or liquid ingredients and other items or substances.

Various dispensers are known in the art. U.S. Pat. No. 3,276,636 (Johnson, Jr.) describes an article dispenser having a bottle and a roller having a pill accommodating cavity or recess in its side wall. Following inversion of the bottle and entry by gravity of a pill into the cavity, rotation of the roller will position the cavity to permit escape of the pill.

U.S. Pat. No. 4,522,313 (Jennings et al.) describes an article dispenser having a vessel for storing articles and a sphere having a cavity for scooping up and delivering an article by rotation of the sphere.

U.S. Pat. No. 6,112,942 (Deacon) describes a tablet dispensing cap that allows an individual to dispense a single, non-liquid form by rotation of a hub having cavities.

The novel dispensers and features of the invention described herein may offer various benefits and conveniences to users, depending on a particular embodiment and application.

SUMMARY OF THE INVENTION

The invention is a dispenser device for dispensing a controlled number of solid items, or a certain quantity of a variable quantity substance, such as a powdered, granular or liquid substance, through rotation of a roller having one or more cavities for delivering the item or substance.

DETAILED DESCRIPTION OF THE INVENTION

In the following detailed description of the invention, reference is made to the figures, which illustrate exemplary specific embodiments of the invention. It should be understood that varied or additional embodiments having different structures or methods of operation might be used without departing from the scope and spirit of the disclosure.

In general, the inventions are a variety of dispensing devices for dispensing a predetermined number or a controlled quantity of items or substances (collectively termed herein "dispensable article").

Figure 1:
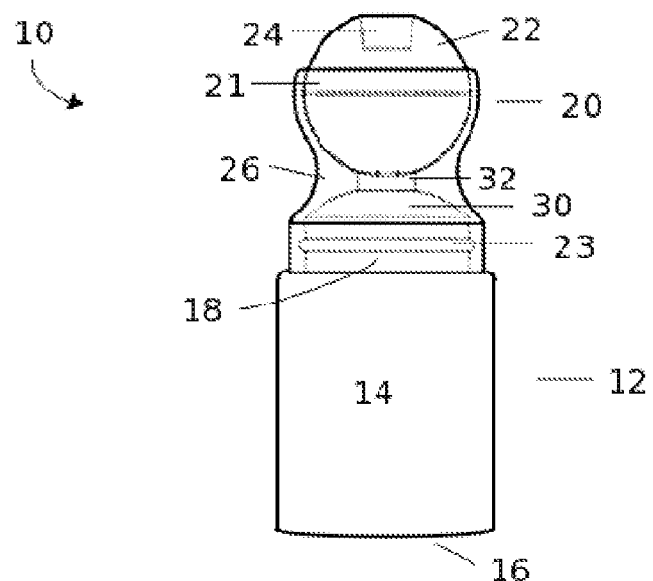
FIG. 1 is a cross-sectional illustration of a dispenser in accordance with the invention.

In one exemplary embodiment, as shown in FIG. 1, the invention comprises a hand-held dispenser 10 adapted for ease of use, including potential one-handed operation, such as for those who may be suffering from arthritis, nerve damage, or other condition affecting one's ability to comfortably or reliably grip, grasp or manipulate an item sufficiently.

The dispenser 10 in this embodiment includes a body 12 including a storage space 14, base 16 and an opening 18, and a removable or fixed top 20a. In this embodiment, the top 20a includes a roller 22 that may take the form of, for example, a sphere, a semi-sphere (e.g. elliptical or oblong form) or a roller (e.g. cylinder). The roller 22 is disposed and rotatable within a housing 26.

The roller 22 has formed therein one or more cavities 24 (see also, FIGS. 2A and 2B), and is rotatable such that a cavity 24 is movable within an area of the top 20a, from a position in communication with the storage space 14 via the opening 18 (a receiving position), to a position in communication with an area outside the body 12 (a dispensing position). The roller 22 in this and other embodiments may include multiple cavities 24.

Figure 11:
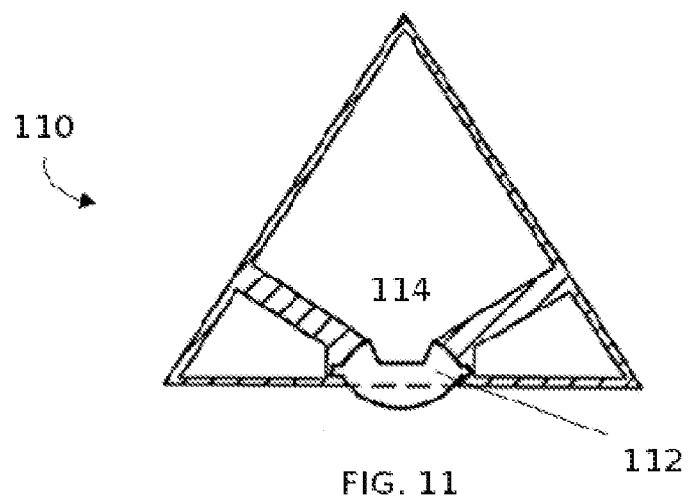
FIG. 11 is a cross-sectional partial view of a polygonal dispenser box having a funnel portion in accordance with the invention.

The dispenser 10 in accordance with this embodiment of the invention is further illustrated as including a funnel portion 30 and a neck 32 thereof disposed within or near an opening 18. Depending on factors including a particular item or material being dispensed, design features and orientation utilized, etc., the funnel portion 30 and a neck 32 may be found to improve ease of operation by directing items or material to be dispensed more effectively toward a cavity 24 disposed to receive the item or material, particularly near the end of a supply of items (e.g., a last pill or two) or material, and may reduce or prevent jamming of the moving mechanism. FIG. 11 illustrates a funnel 114 as an alternative embodiment of the described funnel concept.

In one embodiment, a cavity 24, when positioned in communication with the storage space 14 via the opening 18, is adapted to receive one, two or other controlled number of a plurality of pills or other objects (or controlled amount of a powdered, granular or other loose substance), i.e., a dispensable article, disposed within the storage space 14, upon inversion (moving base 16 gravitationally above opening 18) of the dispenser 10. While remaining inverted, the cavity 24 having received the number or amount of objects or substance from the storage space 14, the dispenser 10 may be manipulated in any of a variety of ways to rotate the roller 22 and dispense the object(s) or substance. For example, the roller 22 may be rotated through movement of the dispenser 10 with respect to a fixed surface with which the roller 22 is held in contact (an exemplary single-handed operation), or through relative movement with respect to the palm of a user's hand, in which case the dispenser 10 may be held in the user's other hand or be itself mounted or otherwise fixed.

As an alternative to maintaining the dispenser 10 in an inverted position during a dispensing operation, the cavity 24 may be adapted to have an appropriate shape or with an appropriate material for retaining an object upon contact, such that it remains, although the dispenser 10 may be returned to its resting (non-inverted) position. For example, the cavity 24 may be lined with a deformable, spring-like (i.e. returns to its original shape) or tacky material for temporarily gripping an object to be dispensed.

Numerous variations are contemplated, depending upon a particular application, intended user, or other factors. A roller 22 and a cavity 24 may be any desired size and shape, depending for example upon a size of a dispenser 10, storage space 14, and/or opening 18, a size and shape of the items or material to be dispensed, etc. A larger roller 22 may be better suited for multiple cavities 24.

Figure 2A:
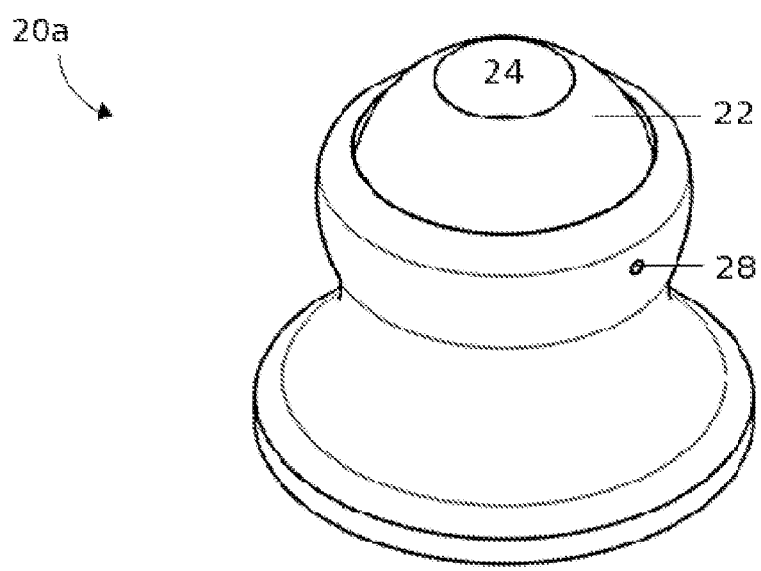
FIG. 2A is a perspective view of a dispenser top in accordance with the invention.

The dispenser 10 of the invention may be provided together with a body 12, or separately. An exemplary separate embodiment, which may be adapted with threads or other known means for attachment to any of a variety of standard containers, is shown in FIG. 2A. Such a dispenser 10 may also be adapted with multiple rings at a base 18, such that the dispenser 10 may be interchangeably used with multiple sizes of container, the connection being through friction, threading or other such means.

Figure 3:
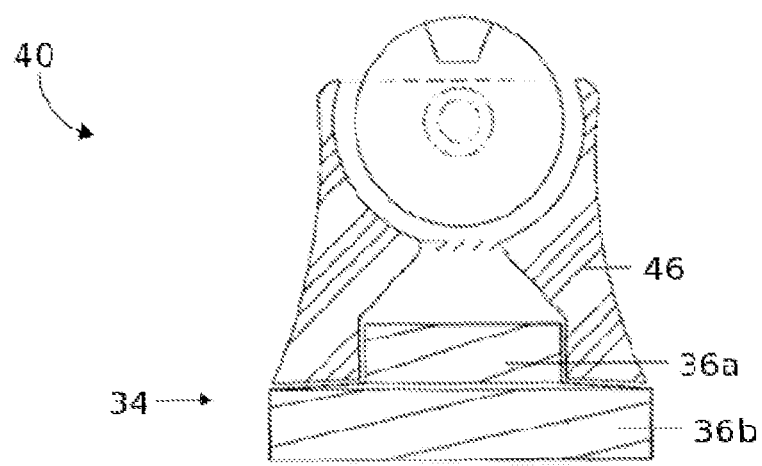
FIG. 3 is a cross-sectional illustration of a dispenser having a coupler in accordance with the invention.
Figure 4:
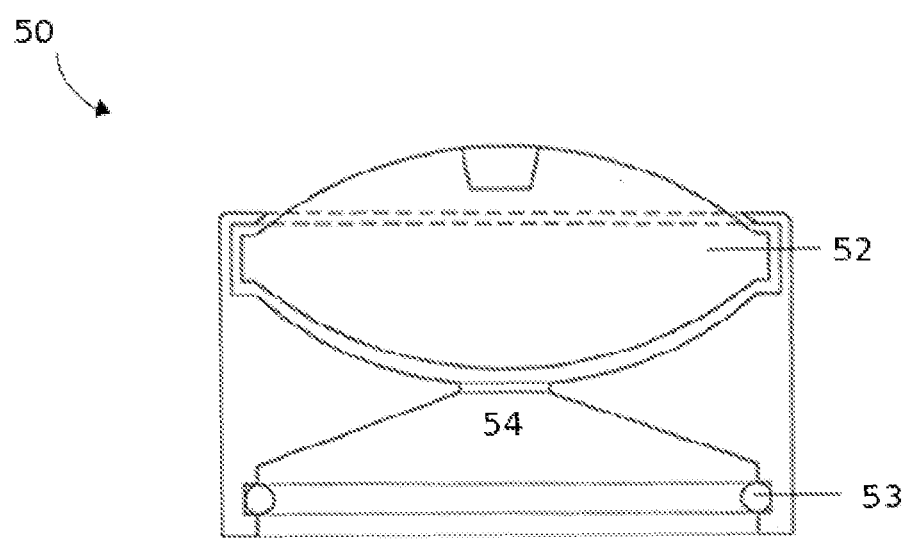
FIG. 4 is a cross-sectional illustration of an alternative embodiment of a roller for a dispenser in accordance with the invention.

FIG. 3 illustrates an embodiment of the invention for adapting a dispenser top 40 to containers such as bottles of varying sizes using a coupler 34. The coupler 34 in this embodiment includes two coupling portions 36a and 36b. Among contemplated options are the coupling portion 36a being threaded on an outside to mate with threads on a housing 46 of the dispenser top 40, and the coupling portion 36b being threaded on an inside to mate with threads on a container. In either or both of the coupling portions 36a and 36b, threading may alternatively be substituted with an o-ring or other item or form, which may be formed as a protrusion in a material of the coupling portion 36a and/or 36b itself or made of a spring-like material such as rubber, or another material for a frictional coupling with either or both of the dispenser top 40 and a container having therein items or a material to be dispensed. By way of example, FIG. 4 illustrates such a ring 53 in cross section in FIG. 4. Such a friction adaptation may also be formed or placed in the coupler 34 itself, illustrated in an exemplary form as a ring or deformation 23 in FIG. 1.

As noted, a coupler may further be formed from a single material, as where the described friction based features are incorporated as part of a mold or other manufacturing process. For example, the malleable plastic commonly used in a top that snaps onto a known pharmaceutical container may be used. In this way, any of a variety of couplers 34 may be substituted for use of the dispenser top 40 with any of a variety of containers.

Although the invention has been illustrated with a single cavity 24 in some embodiments, it is also contemplated that multiple cavities 24 be included. This may allow for a more rapid deployment of items or substance to be dispensed with respect to a particular movement of the roller 22. Such an embodiment may further benefit from cavities 24 being individually numbered or including a tactile indication of numbers 1 through n, particularly in a medical application, such as to indicate how many pills a user has taken within a certain period, such as during a single day, as where multiple pills per day are prescribed. A cavity 24, or a position of the roller 22 without a cavity 24 (e.g., a starting position), may be labeled "start" or "0" to indicate a starting position for the day. Such additions may be especially useful in conjunction with a "selector" and/or "clicker" adaptation, discussed below.

A roller 22 of the top 20a, and analogous features in other embodiments, rather than freely moving in all directions, may also be adapted with an axle (not shown), a hole 28 for which is shown in FIG. 2A, such that movement of the roller 22 is limited to a single rotational direction. In one embodiment, as illustrated, an axle is parallel to a plane of an outer rim 21 of a top 20a, while one or more cavities 24 are disposed on a roller 22 along a circumference perpendicular to the axle. In another embodiment, either or both of the angle of the axle and the angle of the circumference upon which the one or more cavities 24 are disposed are varied. Of course, the cavities 24 need not be disposed on a single circumference. Rather, the placement may be varied depending on an intended application.

Figure 2B:
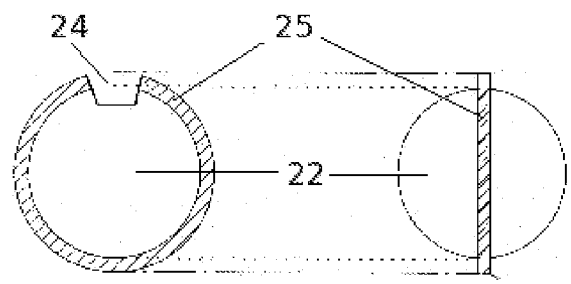
FIG. 2B is illustrates cross sections through a guide of a roller (left) and perpendicular thereto (right) in accordance with an embodiment of the invention.
Figure 2C:
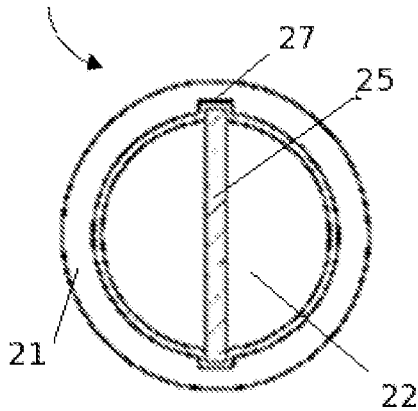
FIG. 2C is a cross-sectional illustration of a dispenser roller having a guide in accordance with an embodiment of the invention.
Figure 2D:
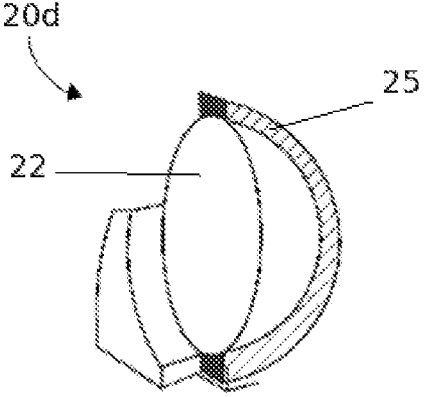
FIG. 2D is a three-dimensional perspective view of a dispenser roller having a guide in accordance with an embodiment of the invention.

In another embodiment, illustrated by FIGS. 2B-2D, dispensers 20b-20d have a roller 22 in accordance with the invention that is adapted with one or more guides 25, such that rotation of the roller 22 is restricted (i.e., it is prevented from freely moving in all directions). As illustrated by FIGS. 2B-2D, a single guide 25 may be formed about a circumference of a spherically shaped roller 22. In use, a guide 25 moves within a channel 27 formed in an outer rim 21 of a dispenser housing, as illustrated by FIG. 2C. A single guide 25, or multiple guides 25 in parallel, might alternatively be disposed around less than a full circumference. As disclosed herein, one or more cavities 24 of a roller 22 may likewise be disposed in a variety of positions (see FIG. 2B), here along a guide 25 or offset therefrom, as may be preferred to avoid altering a quantity of material dispensed from a given cavity 24. In any such embodiment or in other variations, the one or more guides 25 may be formed such that (e.g., around a circumference), upon rolling the roller 22 across a surface, the guide portion of the roller 22 contacts the surface, while the spherical body of the roller 22 does not (see FIGS. 2C and 2D). In this implementation, the one or more guides 25 may improve friction between the roller and a surface, such as a hand or countertop. As such, the use of a rubber-like or other somewhat malleable and/or tacky material may be used. A guide 25 may be added to a roller 22 during or after manufacturing, or may be part of a unitary roller 22, e.g., may be carved, molded, etc., from a single material to arrive at a roller 22 having one or more guides 25.

In an embodiment in which interchangeable rollers 22 are utilized, and in which it is desirable to limit a direction of movement of the roller 22, adapting the roller 22 with one or more guides 25 might improve ease of insertion and/or removal of such a roller 22, versus an axle embodiment, for example, in addition to facilitating operation of the roller 22 during use.

The roller 22 may also be adapted with a detent mechanism or other known "selector" type means, such that the roller 22 rotates through a limited number of predetermined positions, which may include among others the positions in which the cavity 24 is positioned to receive from the storage space 14 an item or substance to be dispensed, and a position rotated approximately 180 degrees therefrom, in which the item or substance may be dispensed (in a single-cavity embodiment). In a multiple-cavity embodiment, preferential positions may be calculated based on a number of cavities, including, in an embodiment including visual indications, those positions in which the indications are most clearly viewed. A mechanism may further include a "clicker" or other sound generating means for producing a noise as the roller 22 is rotated. These adaptations may generally improve an ease of use, in particular for users that may suffer from reduced visual acuity.

Figure 12:
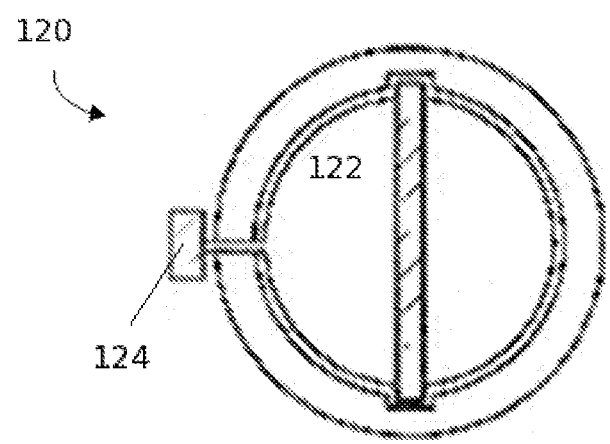
FIG. 12 is a cross-sectional view of a roller having a wheel connected thereto in accordance with an embodiment of the invention.

A roller in accordance with the invention might further include a lever, wheel or other suitable adaptation adjacent thereto for enabling manual rotation or other dispensing movement of the roller by hand, fingers, mouth, etc., depending upon an application, without necessitating contact between a roller (or guide, depending upon an embodiment) and a secondary surface, such as a countertop or hand. FIG. 12 illustrates an embodiment of a dispenser top 120 having a roller 122 having a wheel 124 connected thereto at an end of a rotational axis of the roller 122. Upon manual activation of the wheel 124, the roller 122 may be turned to move a cavity (not shown) between a loading position and a dispensing position in order to initiate a dispensing operation.

In other embodiments, a roller 22, which has herein been illustrated as a spherical shape, may, as noted above, take other forms, depending on a particular application. In a medical embodiment, for example, certain medicament forms, such as capsules and caplets, may be better delivered by a roller having an elliptical, lemon-shape or oblong form, or having the form of a roller (e.g. cylinder). For example, FIG. 4 illustrates a dispenser top 50 having a roller 52 having an elliptical, lemon-shape or oblong form. The dispenser top 50, for purposes of illustration, further includes a funnel portion 53.

With reference again to FIGS. 1 and 2 for ease of description, a roller 22 may be fixedly disposed within a housing 26 as part of a manufacturing process, or may be inserted and removed as desired, such as through a deformable or flexible rim portion 21, for example an o-ring. In another embodiment, the housing 26 may be formed from multiple, connectable portions, e.g. two half-shells, on a vertical, horizontal, or other axis, wherein the roller 22 is seated in a first portion, and held through the placement and attachment of a second portion. These embodiments may permit easier replacement or exchange of rollers for different applications.

Like the entire device, a roller 22 in particular may be formed of a variety of materials, including plastic, rubber and metal. A soft or hard rubber or other tacky material may be beneficial in certain embodiments, such as where in use a roller 22 is placed in contact with a table or other surface, with the dispenser 10 being moved with respect thereto in order to actuate rotation of the roller 22.

Included within the scope of the invention are variations in a size and shape of a cavity 24, depending on a size and/or shape of a roller 22, among other factors. For example, when dispensing a certain item, it may be beneficial to adapt a shape of an interior portion of a cavity 24 to better receive the item, or to guide the item into a certain orientation when entering the cavity 24 from a storage space 14 through an opening 18. A cavity 24 may be adapted to accept multiple items for delivery. In an exemplary embodiment for dispensing an elongated (i.e. non-spherical) object, such as a caplet-type object in a medical or food environment, an approximate "W" shape or "VV" (double-V) shape (see e.g., FIG. 6B) formed in the interior of a cavity 24 may guide the object into a certain orientation, as to reduce a probability of multiple objects entering or of jamming occurring.

Figure 13A:
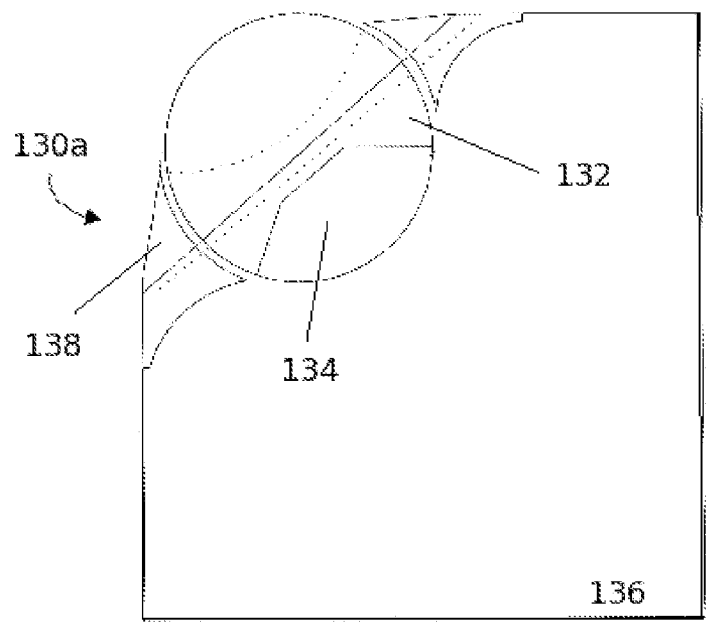
FIGS. 13A and 13B are a cross-sectional views of a container having a serving size dispenser in accordance with an embodiment of the invention, the view of FIG. 13B being rotated 90 degrees from the view of FIG. 13A.
Figure 13B:
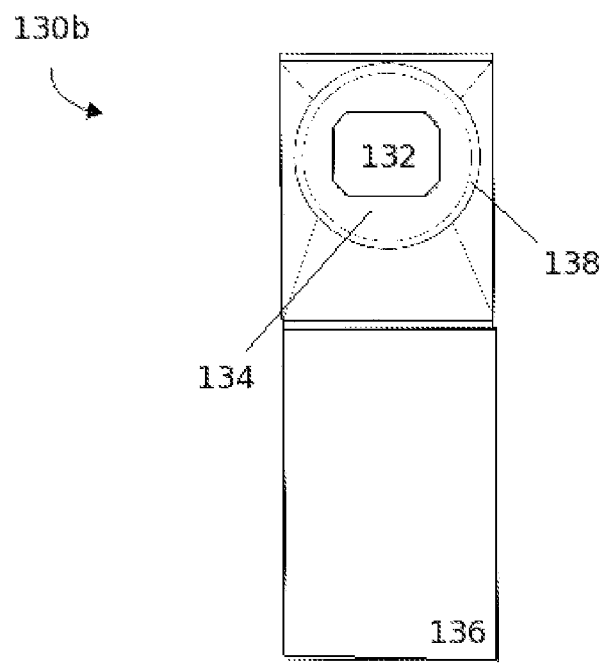

The invention is not limited to dispensing singular or a small number of items. The focus may go beyond a particular number of items to a quantity, as discussed herein with regard to a spice-dispensing embodiment, for example. Applying this concept to larger items (or items typically enjoyed in larger quantities/numbers), such as nuts, cereal, pasta, etc., a roller in accordance with one embodiment of the invention is adapted for incorporation into boxes and other containers in which such items are sold, or with after market containers, for use in meting out approximate whole single or multiple serving size portions of any of a variety of items. With respect to granola, as an example, upon reading provided nutrition information, consumer confusion often remains with respect to how much needs to be consumed to arrive at the listed levels of vitamins, fat, calories, etc., for purposes of weight loss, nutrition, food sensitivities, overall general health, etc. For example, stated serving sizes are sometimes found to be deceptively small, leading to unintentional overeating, weight gain, etc. FIGS. 13A and 13B illustrate an exemplary container 130a and 130b having a roller 132 with a portion control cavity 134 for dispensing items stored in the space 136 of the container, such as by serving size or other desired measure. A freshness seal 138 may also be provided.

Figure 14:
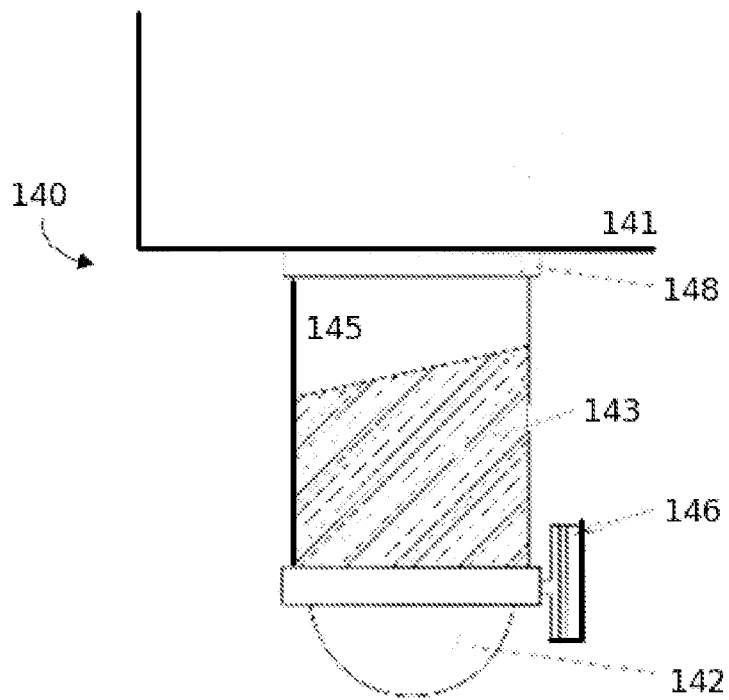
FIG. 14 is a partial cross-sectional view of a dispenser in accordance with an embodiment of the invention.

FIG. 14 illustrates an embodiment of the invention that might be suitable for use in dispensing a serving size, baking measure, or the like. A dispenser 140 may be attached using a bracket or adapter 148 to, for example, the underside of a cabinet 141 or other suitable or convenient position, as in a kitchen for ready access for cooking, a health care office for dispensing sanitary materials (e.g., cotton balls), etc. In this embodiment, a hand crank 146 or other external adaptation may be useful for providing greater leverage (versus e.g., a smaller thumb/finger wheel) for turning a larger roller 142. The dispenser 140 might be adapted for use with a separately provide plastic type storage container (e.g. Tupperware®), glass jar, etc., or incorporated into them during a manufacturing process. Such an embodiment might find utility for neatly and conveniently dispensing serving size bowls of various items, cups or other measures of flour, sugar, oatmeal or other cooking material or food 143 from a storage area 145.

Figure 15:
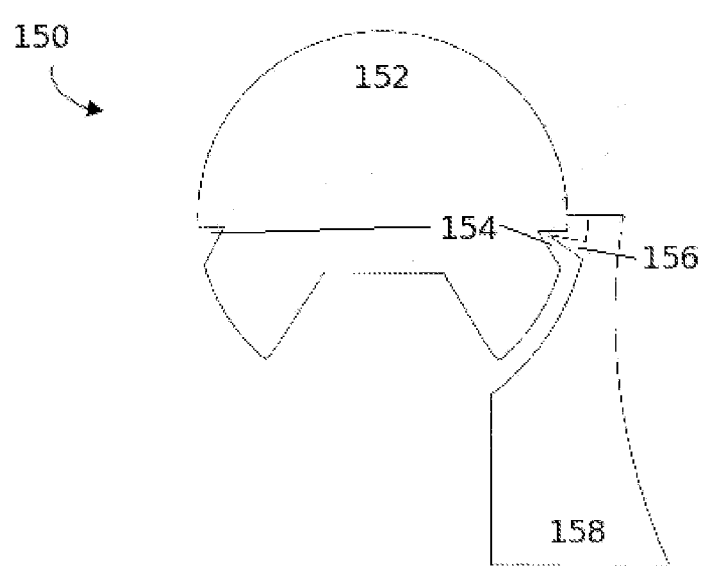
FIG. 15 is a cross-sectional view of a mounted dispenser in accordance with an embodiment of the invention.

As disclosed herein, such an embodiment might further be provided with a mechanism for producing a sound as a dispenser is operated through select positions, and/or further establishing such positions as stopping points along a rotation or sliding motion of the roller, i.e. to divide the otherwise smooth movement into discrete segments. FIG. 15 (not to scale) roughly illustrates this concept via a cutout view of a dispenser 150 having a roller 152 having one or more notches 154. A flexible tab 156 formed in a dispenser body 158 intermittently mates with the one or more notches 154 to cause an audible indication (for example, a click) and/or a point of increased friction during movement of the roller 152, such as at a loading position and/or at a dispensing position.

Figure 5:
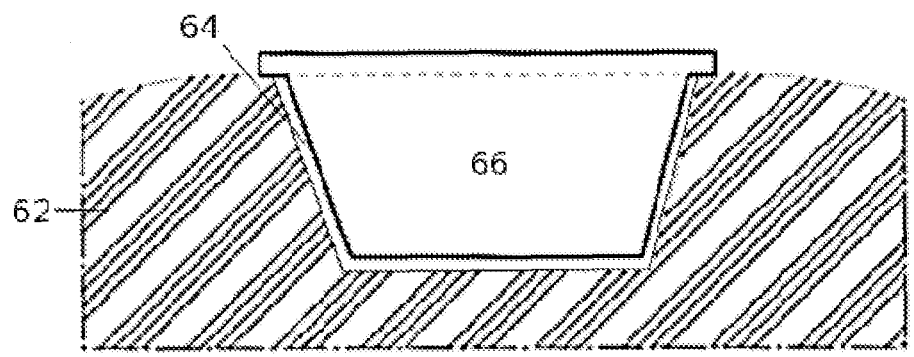
FIG. 5 is a cross-sectional partial view of a roller having an insert in accordance with a dispenser of the invention.
Figures 6A, 6B:
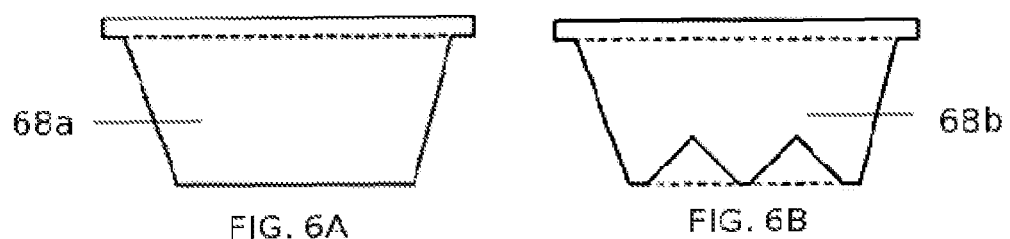
FIGS. 6A and 6B are sectional views of embodiments of inserts in accordance with the invention.

Depending upon a particular implementation, a variety of contemplated shapes of cavity 24 may be achieved through interchangeable rollers 22, as noted, or may be provided individually or as part of a larger included container, as perhaps in an embodiment for dispensing cereal. The variety may also be achieved by way of removable and interchangeable inserts into a standardized receiving portion of a roller 22, wherein each insert itself acts as a cavity of a different size and/or shape. FIG. 5 illustrates a cutout view of a roller 62 having a cavity 64. Inserted therein is an exemplary insert 66. The insert 66 may be held in place by tabs (not shown), friction points, or other known means. FIGS. 6A and 6B illustrate exemplary embodiments of inserts 68a and 68b in accordance with the present invention.

In certain applications, in addition to a dispenser top adapted for use with commercial containers and other products, it might be desirable as well to maintain a dispensing feature of a commercial product, such as a spice shaker, while adding a dispenser in accordance with the invention. For example, a dispenser top might be provided having a roller as disclosed herein, while also being adapted for a sifter top as commonly found in the spice and other markets. In one embodiment, a dispenser top is provided having a hinged door adjacent a roller with a cavity, such that a user may alternately utilize the dispenser function of a roller as disclosed herein, or rather open the door to dispense the spice or other material through a sifter (or an opening without any adaptation) in a more traditional manner.

In another embodiment, a dispenser top in accordance with the invention may be applied to a container over an existing sifter or other original top, such that an operation of a dispenser as disclosed herein is unaffected, while maintaining the option to remove the dispenser top for continued use of the original commercially available dispenser.

Figure 7:
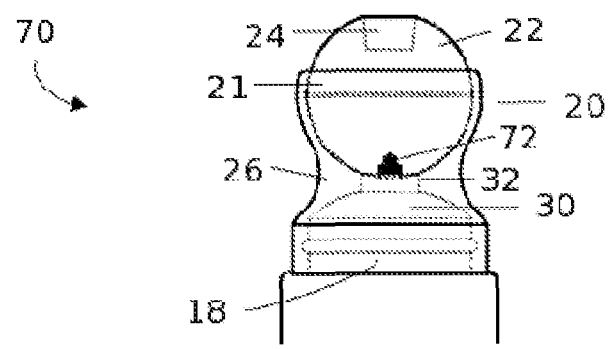
FIG. 7 is a cross-sectional illustration of a dispenser having a weighted roller in accordance with the invention.

In an embodiment of the invention, whether or not using an axle, a roller 22 of the dispenser 10 may include a weighted portion for influencing a natural resting position of the roller 22 and cavity 24. For example, providing a weight disposed opposite a cavity 24 in certain embodiments where a roller 22 is relatively freely moving, will influence the roller 22 such that the cavity 24 moves naturally or more easily into a position to receive an item or substance to be dispensed when the dispenser 10 is inverted. FIG. 7 illustrates an exemplary dispenser top 70 including a counter-weight 72 as described. Alternatively, with exemplary reference to FIG. 1, one or more magnets may be disposed in the housing region 26, such as a mid- to lower (in an upright position) position, with one or more opposing magnets being disposed in a roller 22, opposite a cavity 24. This tends to influence the cavity 24 of the roller 22 away from a position to receive an item or substance to be dispensed from a storage space 14, and toward a position to dispense the item or substance, absent external forces. Magnets may also be positioned so as to favor both a receiving and dispensing position.

Figure 8:
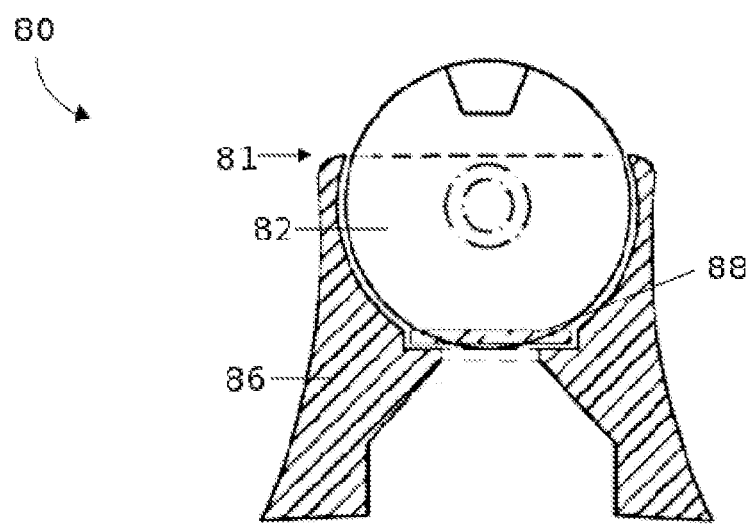
FIG. 8 is a cross-sectional illustration of a dispenser having a spring assembly in accordance with the invention.

Depending on a particular embodiment and application, as illustrated by FIG. 8, a spring 88 may further or alternatively be provided in a region of a neck of a dispenser top 80 to dispose the roller 82 in the direction of the rim 81 (and optional seal, see below) of the housing 86 when the dispenser is not in current use. When pressure is applied to the roller 82, the optional seal releases slightly, allowing free motion of the roller 82.

Figure 9:
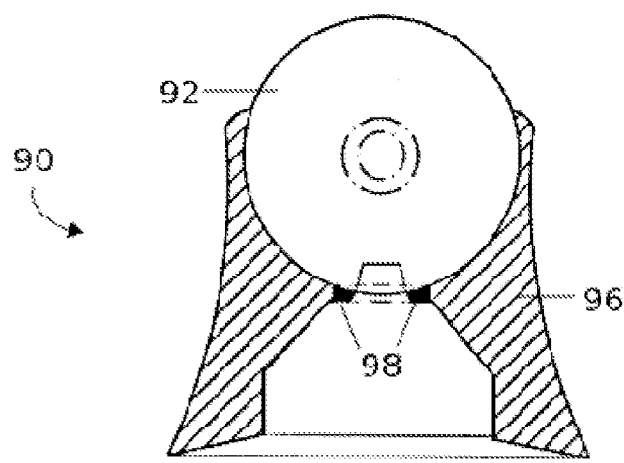
FIG. 9 is a cross-sectional illustration of a dispenser having a seal in accordance with the invention.

In addition, as illustrated by FIG. 9, a housing 96 may include one or more gaskets, o-rings or other adaptations, e.g. a seal 98 (shown in FIG. 9 in cross section) in circular or other appropriate shape/form, depending on a shape of the dispenser, cavity, etc., such that a seal is formed between the housing 96 and the roller 92. A seal may be desirable around a neck of the dispenser top 90 and/or, as discussed above, around a rim of a dispenser housing. A hermetic (i.e. airtight) or other seal may be required in certain medical applications, among others. Further, in applications for dispensing a loose granular substance, and particularly a finely powdered substance, a form of ring or other seal may be desired for physically preventing transfer of the substance from a storage space and out of a dispenser except via a cavity; e.g. for a "squeegee" effect, as to prevent "leakage" into any space that may exist between a roller 92 and the inside of a housing 96.

Alternatively, a more rigid tolerance design may seek to reduce or effectively (in light of a material to be dispensed) eliminate the potential space altogether, such as in an embodiment for dispensing a liquid or finer powder. In a looser tolerance design, an additional material may be provided in the space between the roller 92 and the housing 96, providing a full spherical cushion or barrier of a malleable, spring-like or self-sealing material, such as a type of rubber, Teflon® or other suitable material.

Figures 10A, 10B:
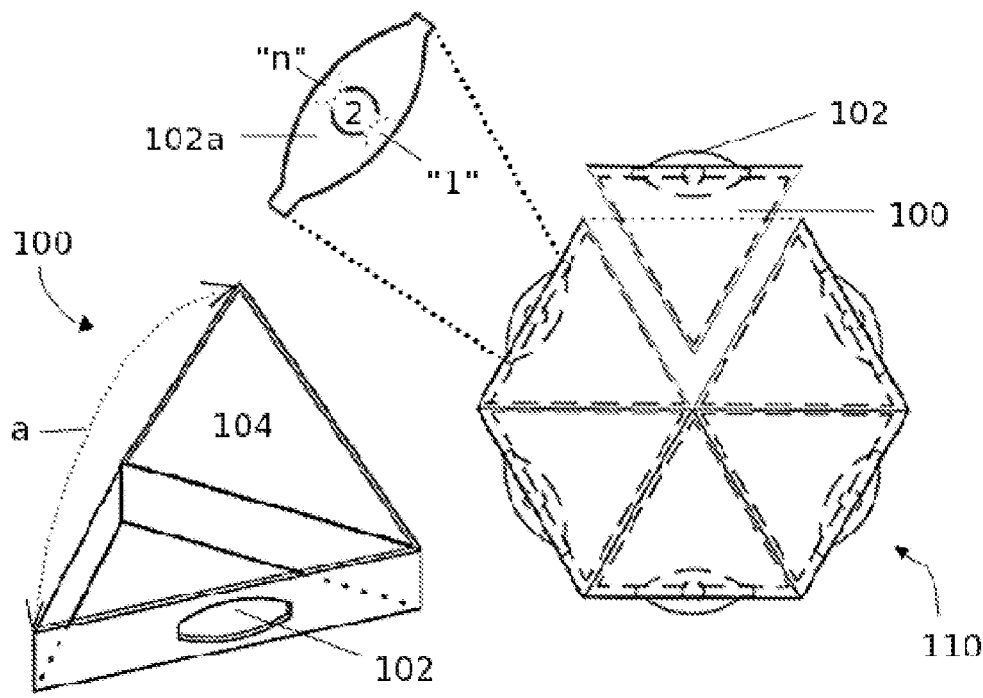
FIG. 10A is a perspective view of a portable polygonal dispenser in accordance with the invention.
FIG. 10B is a cross-sectional illustration of an embodiment of a multi-chamber dispenser in accordance with the invention.

Without departing from the scope and spirit of the invention, the dispenser and dispensing concepts as described herein may also be applied outside of a more traditional environment involving a bottle or other container and dispenser top as thus far primarily illustrated. In one embodiment, a dispenser in accordance with the invention takes the form of a separate container having one or more built-in rollers. In a specific embodiment, illustrated by FIGS. 10A and 10B, a dispenser box 100 shown in polygonal form and having a roller 102 is provided to offer a potentially more convenient and/or portable use. In one variation thereof, the box 100 includes a lid 104, opening and closing through an exemplary range of motion generally indicated by a line a, permitting use for a more limited or single-day supply of medication. Where desired, the box 100 may be adapted, such as through snap tabs, friction connections or other known means, for connection to others, such that multiple boxes 100 may form a multi-chamber box having one or more rollers 102 for selectively dispensing from the individual walled chambers. Such an embodiment may also be useful in a retail food environment, as for example as a means to offer to consumers a convenient variety pack of any of a variety of items, e.g., gum, mints, etc.

In a more specific embodiment, a multi-chamber box takes the form of a hexagonal box 110 (see FIG. 10B) having six chambers for items or substances, with each chamber being easily refillable via the lid 104 and each chamber having a dispensing roller 102, which optionally includes multiple numbered cavities labeled "1" through "n" as discussed above and shown in FIG. 10B as an enlarged view of a roller 102a. Combinations of a number of boxes 100 greater or fewer than six are contemplated, such as seven to correspond to days of the week or other factors. Partial polygonal shapes are contemplated as well, such as a partial triagonal form of FIG. 10A, but having a rounded base, such that when combined as in FIG. 10B, a circle is formed. Such a circular dispenser may be formed as described (via a combination of individual dispensers), or further may be formed as a unitary case having chambers formed therein. In one embodiment, the chambers are rotatable for selective communication with a single roller, formed in a wall of the case. Countless additional variations are contemplated. Such forms as described above may further be adapted to be stackable, such as through their shape, the addition of corresponding holes and tabs or protrusions, etc.

The component boxes 100 may be preformed as a part of a multi-chamber device, or be selectively connectable from individual boxes 100 that may be dissembled and assembled in combinations of a desired number of units. Such an embodiment may be especially useful in a medical application, as where a user is required to take varying numbers of a plurality of medications daily. A multiple-chambered container may simplify this process by providing a convenient means to carry medication, and dispense pills while providing a potentially important reminder of a number taken thus far.

Like other embodiments described herein, a polygonal embodiment may be adapted with a funnel feature for appropriately directing items or substance to be dispensed. The funnel aspect may be achieved by an outward shape of a box, for example through curvature of a base of the triangle of the dispenser box 100 in a polygonal embodiment. Alternatively, as illustrated by FIG. 11 as a dispenser box 110, the box may include a funnel area 114 for directing an item or substance toward a roller 112.

Beyond those discussed herein, countless applications for the invention are contemplated. Applications involving dispensable articles including medication dispensed in the form of pills, tablets, capsules, caplets are discussed above. Likewise, the invention might be used or adapted for dispensing candy or other food items of suitable shape and form. The invention may be used for dispensing herbs, spices or other powdered, granular or other such loosely maintained substances, as well as syrups or other liquids and other dispensable articles.

In addition to various functional aspects, matters of aesthetics, as well as branding, are also contemplated. For example, various embodiments, that of FIG. 10B being exemplary, may be adapted to include an available surface to which may be applied an aesthetic feature (a pleasant image or design, a mirrored surface, branding or cartoon imagery, etc.), as by a decal, etching or other means. Likewise, in an embodiment including a bottle and roller, aesthetic features may be used to, for example, improve desirability to a younger audience, such as through the use of popular images or characters. In one embodiment, a cavity of a roller is made to coincide with an eye, mouth, head or other feature of a character whose image is integrated into a design of the dispenser.

Applications outside of foods and consumables are further contemplated. The concepts of the invention may have applicability in manufacturing, for dropping or dispensing items such as parts or materials as needed, for example along an assembly line; and dropping solid, granular, powdered, liquid, etc. ingredients or decoration in a food environment; among others. In one embodiment, in a variation on a magnet embodiment described above, electricity is used to control a dispenser. For example, switched electromagnets may be used to power a roller between dispensing and receiving positions. Alternatively, a solenoid, coil or other known mechanism may be used.

Nor is the invention limited to any particular position within the supply chain, as concepts disclosed herein may be suitable at the manufacturing level as incorporated into a product line, or provided as an after-market concept or device through suppliers or retailers, etc. The concepts, methods and apparatus disclosed may be used in countless other applications not expressly mentioned herein without departing from the scope and spirit of the invention.

While the description herein may refer to specific reference numbers in the figures, the description is likewise applicable to analogous elements having different numbers. For example, descriptions of features of a dispenser top 20a may likewise apply to other dispenser tops 40, 50, 80, etc.

What is claimed is:

1. A dispenser comprising:
   a polygonal body;
   two or more compartments formed by walls within the body for holding a dispensable article; and
   a connector for connecting a first compartment of the two or more compartments to a second compartment of the two or more compartments, wherein the two or more compartments are separable into individual portable dispensers;
   wherein at least one of the two or more compartments has disposed in an outer wall thereof a roller having a cavity, such that upon operation of the roller, the dispensable article is dispensed via the cavity from the at least one compartment having the roller in the outer wall thereof.

2. The dispenser of claim 1, wherein the connector is an o-ring friction connector.

3. The dispenser of claim 1, the polygonal body comprising:
   a heptagonal polygon formed from seven of the two or more compartments.

4. The dispenser of claim 3, the dispenser comprising a medicament dispenser, wherein each of the seven compartments corresponds to a day in a seven-day week.

5. The dispenser of claim 1, the two or more compartments each comprising a partial triagonal form having a rounded base.

6. The dispenser of claim 5, wherein the two or more compartments are rotatable within the polygonal body for selective communication with the roller.

7. The dispenser of claim 1, wherein the two or more compartments are rotatable within the polygonal body for selective communication with the roller.

8. The dispenser of claim 1, further comprising:
an adaptation formed in an outer surface of the polygonal body, the adaptation being adapted to receive an aesthetic feature.

9. The dispenser of claim 8, the aesthetic feature being chosen from imagery, design, a specialized surface, branding or a cartoon.

10. The dispenser of claim 1, further comprising:
a lid hingedly connected to one of the walls of a covered compartment among the two or more compartments within the body, for enabling opening and closing of the covered compartment.

11. The dispenser of claim 1, further comprising:
multiple cavities formed within the roller.

12. The dispenser of claim 11, further comprising:
selector means for biasing a position of the roller into a one of a predetermined number of predetermined positions.

13. The dispenser of claim 12,
visual indicia formed in each of the multiple cavities.

14. The dispenser of claim 13, the visual indicia indicating a number corresponding to one among a total number of the multiple cavities formed within the roller.

15. The dispenser of claim 1, the polygonal body comprising a substantially rectangular body, wherein the dispenser is adapted for dispensing one or more powders.

16. The dispenser of claim 15, the cavity being formed in the roller, the cavity having a predetermined capacity for dispensing a predetermined amount of one of the one or more powders per operation of the roller.

17. The dispenser of claim 1, further comprising:
a freshness seal for maintaining an airtight condition within at least one of the compartments, wherein the dispenser is adapted for dispensing food articles.

* * * * *